US008267773B2

(12) United States Patent
Jaffe et al.

(10) Patent No.: US 8,267,773 B2

(45) Date of Patent: Sep. 18, 2012

(54) WAGERING SYSTEM WITH IMPROVED EXPECTED VALUE DURING A SPECIAL EVENT

(75) Inventors: Joel R. Jaffe, Glenview, IL (US); Jamie Vann, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 639 days.

(21) Appl. No.: 12/514,204

(22) PCT Filed: Nov. 5, 2007

(86) PCT No.: PCT/US2007/023262

§ 371 (c)(1),
(2), (4) Date: May 8, 2009

(87) PCT Pub. No.: WO2008/063393

PCT Pub. Date: May 29, 2008

(65) Prior Publication Data

US 2010/0056251 A1 Mar. 4, 2010

Related U.S. Application Data

(60) Provisional application No. 60/858,148, filed on Nov. 10, 2006.

(51) Int. Cl.
*A63F 13/10* (2006.01)

(52) U.S. Cl. ................................ 463/21; 20/25

(58) Field of Classification Search .................... 463/20, 463/21, 25, 27

See application file for complete search history.

(56) References Cited

U.S. PATENT DOCUMENTS

| | | | | |
|---|---|---|---|---|
| 4,752,068 | A | 6/1988 | Endo | 273/1 |
| 5,511,781 | A | 4/1996 | Wood et al. | 273/85 |
| 5,575,474 | A | 11/1996 | Rossides | 463/26 |
| 5,609,525 | A | 3/1997 | Ohno et al. | 463/43 |
| 5,833,537 | A | 11/1998 | Barrie | 463/21 |
| 5,957,775 | A | 9/1999 | Cherry | 463/16 |
| 6,004,211 | A | 12/1999 | Brenner et al. | 463/40 |
| 6,012,045 | A | 1/2000 | Barzilai et al. | 705/37 |
| 6,012,983 | A | 1/2000 | Walker et al. | 463/20 |
| 6,015,344 | A | 1/2000 | Kelly et al. | 463/16 |

(Continued)

FOREIGN PATENT DOCUMENTS

EP 1 462 152 A2 9/2004

(Continued)

OTHER PUBLICATIONS

PCT International Search Report for International Application No. PCT/US2007/023262 dated Jul. 31, 2008 (2 pages).

(Continued)

*Primary Examiner* — Peter DungBa Vo
*Assistant Examiner* — Damon Pierce
(74) *Attorney, Agent, or Firm* — Nixon Peabody LLP

(57) ABSTRACT

A method and system for conducting a wagering game with a changed expected value for a special event based on the achievement of a wagering-game enhancement parameter award. The wagering game includes a base game and a special event. The wagering game has a first expected value attributable to the base game and a second expected value attributable to the special event. The special event occurs in response to a triggering event. The first expected value attributable to the base game is decreased. The second expected value attributable to the special event is subsequently increased to compensate for decreasing the first expected value attributable to the base game.

14 Claims, 10 Drawing Sheets

U.S. PATENT DOCUMENTS

| | | | | |
|---|---|---|---|---|
| 6,068,553 | A | 5/2000 | Parker | 463/27 |
| 6,077,163 | A | 6/2000 | Walker et al. | 463/26 |
| 6,113,098 | A | 9/2000 | Adams | 273/143 R |
| 6,165,071 | A | 12/2000 | Weiss | 463/24 |
| 6,234,896 | B1 | 5/2001 | Walker et al. | 463/16 |
| 6,254,481 | B1 | 7/2001 | Jaffe | 463/20 |
| 6,273,820 | B1 | 8/2001 | Haste, III | 463/40 |
| 6,287,194 | B1 | 9/2001 | Okada et al. | 463/16 |
| 6,302,790 | B1 | 10/2001 | Brossard | 463/20 |
| 6,311,976 | B1 | 11/2001 | Yoseloff et al. | 273/138 |
| 6,319,127 | B1 | 11/2001 | Walker et al. | 463/26 |
| 6,364,765 | B1 | 4/2002 | Walker et al. | 463/16 |
| 6,364,766 | B1 | 4/2002 | Anderson et al. | 463/16 |
| 6,431,983 | B2 | 8/2002 | Acres | 463/25 |
| 6,506,117 | B2 | 1/2003 | DeMar et al. | 463/20 |
| 6,506,118 | B1 | 1/2003 | Baerlocher et al. | 463/25 |
| 6,569,013 | B1 | 5/2003 | Taylor | 463/13 |
| 6,663,489 | B2 | 12/2003 | Baerlocher | 463/20 |
| 6,722,981 | B2 | 4/2004 | Kaminkow et al. | 463/20 |
| 6,722,985 | B2 | 4/2004 | Criss-Puszkiewicz et al. | 463/29 |
| 6,745,236 | B1 | 6/2004 | Hawkins et al. | 709/203 |
| 6,758,757 | B2 | 7/2004 | Luciano, Jr. et al. | 463/43 |
| 6,776,713 | B2 | 8/2004 | Gauselmann | 463/16 |
| 6,780,111 | B2 | 8/2004 | Cannon et al. | 463/25 |
| 6,800,027 | B2 | 10/2004 | Giobbi et al. | 463/24 |
| 6,811,486 | B1 | 11/2004 | Luciano, Jr. | 463/24 |
| 6,923,721 | B2 | 8/2005 | Luciano et al. | 463/24 |
| 6,960,136 | B2 | 11/2005 | Joshi et al. | 463/25 |
| 7,182,690 | B2 | 2/2007 | Giobbi et al. | 463/24 |
| 2001/0024971 | A1 | 9/2001 | Brossard | 463/30 |
| 2001/0046893 | A1 | 11/2001 | Giobbi et al. | 463/24 |
| 2002/0028708 | A1 | 3/2002 | Busch et al. | 463/42 |
| 2002/0039919 | A1 | 4/2002 | Joshi et al. | 463/20 |
| 2002/0077173 | A1 | 6/2002 | Luciano, Jr. et al. | 463/23 |
| 2002/0077174 | A1 | 6/2002 | Luciano et al. | 463/25 |
| 2002/0093136 | A1 | 7/2002 | Moody | 273/139 |
| 2002/0094871 | A1 | 7/2002 | Luciano, Jr. et al. | 463/43 |
| 2002/0107065 | A1 | 8/2002 | Rowe | 463/157 |
| 2002/0151349 | A1 | 10/2002 | Joshi | 463/20 |
| 2002/0196342 | A1 | 12/2002 | Walker et al. | 348/157 |
| 2003/0013515 | A1 | 1/2003 | Rowe et al. | 463/25 |
| 2003/0013531 | A1 | 1/2003 | Rowe et al. | 463/42 |
| 2003/0036422 | A1 | 2/2003 | Baerlocher et al. | 463/20 |
| 2003/0036427 | A1 | 2/2003 | Brandstetter et al. | 463/29 |
| 2003/0064794 | A1 | 4/2003 | Mead et al. | 463/25 |
| 2003/0078101 | A1 | 4/2003 | Schneider et al. | 463/42 |
| 2003/0100362 | A1 | 5/2003 | Horniak et al. | 463/25 |
| 2003/0106769 | A1 | 6/2003 | Weiss | 194/201 |
| 2003/0114219 | A1 | 6/2003 | McClintic | 463/25 |
| 2003/0119579 | A1 | 6/2003 | Walker et al. | 463/20 |
| 2003/0137110 | A1 | 7/2003 | Huard et al. | 273/292 |
| 2003/0153379 | A1 | 8/2003 | Beaulieu | 463/16 |
| 2003/0157979 | A1 | 8/2003 | Cannon et al. | 463/16 |
| 2003/0195024 | A1 | 10/2003 | Slattery | 463/9 |
| 2003/0211881 | A1 | 11/2003 | Walker et al. | 463/20 |
| 2004/0053680 | A1 | 3/2004 | Schultz | 463/20 |
| 2004/0140618 | A1 | 7/2004 | Fox | 273/292 |
| 2004/0142742 | A1 | 7/2004 | Schneider et al. | 463/25 |
| 2004/0195773 | A1 | 10/2004 | Masci et al. | |
| 2004/0209662 | A1 | 10/2004 | Wadleigh | 463/16 |
| 2005/0003886 | A1 | 1/2005 | Englman et al. | 463/25 |
| 2005/0075163 | A1* | 4/2005 | Cuddy et al. | 463/20 |
| 2005/0159207 | A1 | 7/2005 | Thomas | 463/20 |
| 2005/0159208 | A1 | 7/2005 | Pacey | 463/20 |
| 2005/0215311 | A1* | 9/2005 | Hornik et al. | 463/20 |
| 2005/0250576 | A1 | 11/2005 | Kane | 463/17 |
| 2006/0040728 | A1 | 2/2006 | Fuller | 463/20 |
| 2006/0040736 | A1 | 2/2006 | Baerlocher et al. | 463/27 |
| 2006/0068893 | A1 | 3/2006 | Jaffe et al. | 463/20 |
| 2006/0079316 | A1 | 4/2006 | Flemming et al. | 463/25 |
| 2006/0079317 | A1 | 4/2006 | Flemming et al. | 463/25 |
| 2006/0084495 | A1 | 4/2006 | Jaffe et al. | 463/20 |
| 2006/0084496 | A1 | 4/2006 | Jaffe et al. | 463/20 |
| 2006/0089194 | A1 | 4/2006 | Joshi et al. | 463/25 |
| 2006/0135243 | A1 | 6/2006 | Englman et al. | 463/16 |
| 2006/0148549 | A1 | 7/2006 | Walker et al. | 463/16 |
| 2007/0254734 | A1 | 11/2007 | Gilmore et al. | 463/20 |
| 2007/0259706 | A1 | 11/2007 | Anderson et al. | 463/16 |
| 2007/0259713 | A1 | 11/2007 | Fiden et al. | 463/25 |
| 2007/0265060 | A1 | 11/2007 | Hornik et al. | 463/20 |
| 2008/0113770 | A1 | 5/2008 | Gelber et al. | 463/25 |

FOREIGN PATENT DOCUMENTS

| | | | |
|---|---|---|---|
| GB | 2411 750 | | 9/2005 |
| WO | WO 99/29381 | | 6/1999 |
| WO | WO 2005/082480 | A1 | 9/2005 |
| WO | WO 2006/002241 | A2 | 1/2006 |
| WO | WO 2006/004831 | A2 | 1/2006 |
| WO | WO 2006/004832 | A2 | 1/2006 |
| WO | WO 2006/005073 | A2 | 1/2006 |
| WO | WO 2006/017036 | A1 | 2/2006 |
| WO | WO 2006/017067 | A1 | 2/2006 |
| WO | WO 2006/017068 | A1 | 2/2006 |
| WO | WO 2006/020811 | A2 | 2/2006 |
| WO | WO 2006/026250 | A2 | 3/2006 |
| WO | WO 2006/044252 | A2 | 4/2006 |
| WO | WO 2007/103054 | A2 | 9/2007 |
| WO | WO 2008/048634 | A2 | 4/2008 |

OTHER PUBLICATIONS

PCT Written Opinion for International Application No. PCT/US2007/023262 dated Jul. 31, 2008 (7 pages).

Office Action for U.S. Appl. No. 12/514,277, filed Sep. 16, 2011.

* cited by examiner

WAGERING SYSTEM WITH IMPROVED EXPECTED VALUE DURING A SPECIAL EVENT

CROSS REFERENCE TO RELATED APPLICATIONS

This application is a U.S. national stage of International Application No. PCT/US2007/023262, filed Nov. 5, 2007, which is related to and claims priority to U.S. Provisional Application No. 60/858,148, filed Nov. 10, 2006, each of which is incorporated herein its entirety. This application is also related to co-pending application Ser. No. 12/514,277, filed May 8, 2009, which is incorporated by reference in its entirety herein.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to wagering games, and more particularly, to a wagering game system that changes the expected value for awarding a special event based on the occurrence of a bonus outcome.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Bonus games may be awarded as part of the outcome of the base game based on an expected value. The expected value for the bonus game remains constant and therefore events in the game do not have an effect on the probability of earning eligibility to play the bonus game. The random occurrence of bonus games may frustrate some players who have played the base game for long periods of time and expect some progress toward being eligible for the bonus game.

Thus, a need exists for a gaming system having a special event such as a bonus game whose expected value may be adjusted to reflect the unavailability of previous game enhancement parameters previously available to a player. There is a need for a gaming system that allows a special symbol to appear to signify a change in the probability of triggering a bonus event as part of a shift of expected value.

SUMMARY OF THE INVENTION

According to one example disclosed, a method of conducting a wagering game is disclosed. The wagering game includes a base game and a special event. The wagering game has a first expected value attributable to the base game and a second expected value attributable to the special event. The special event occurs in response to a triggering event. The first expected value attributable to the base game is decreased. The second expected value attributable to the special event is subsequently increased to compensate for decreasing the first expected value attributable to the base game.

Another example is a gaming system for playing a wagering game including a base game and a special event. The wagering game has a first expected value attributable to the base game and a second expected value attributable to the special event. The special event occurs in response to a triggering event. The gaming system includes a controller to decrease the first expected value attributable to the base game and subsequently increase the second expected value attributable to the special event to compensate for decreasing the first expected value attributable to the base game.

Another example is a method of conducting a wagering game including a base game and a special event. A first randomly-selected outcome selected from a first plurality of outcomes including a first game enhancement parameter is determined. Subsequent to determining the first randomly-selected outcome, a second randomly-selected outcome selected from a second plurality of outcomes including a second game enhancement parameter associated with a special event and not including the first game enhancement parameter is determined. A determination is made whether the special event is triggered. The probability of triggering the special event is adjusted if the second game enhancement parameter is selected.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
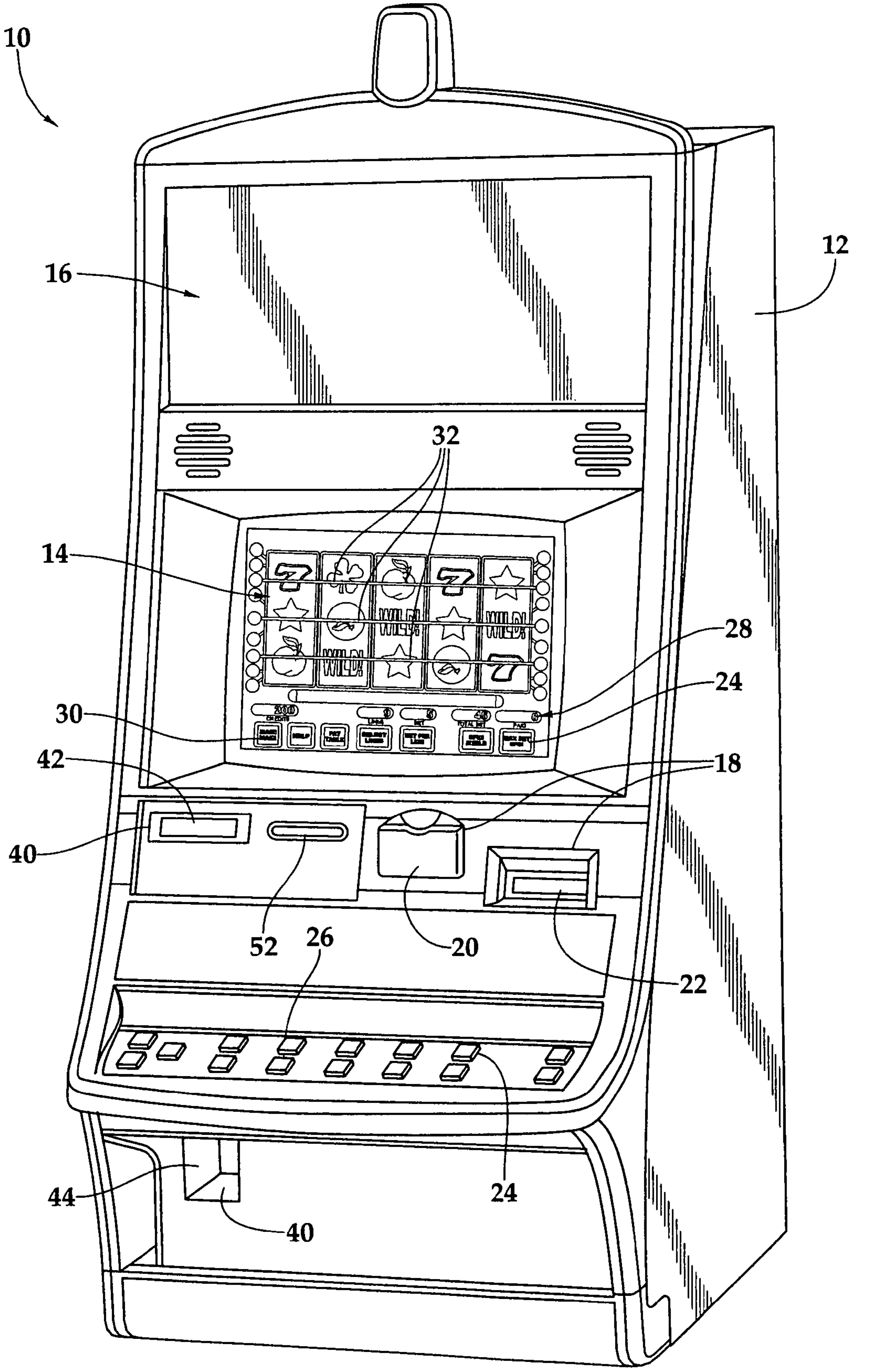
FIG. 1*a* is a perspective view of a free standing gaming machine.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the base wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the base wagering game is displayed to the player on the primary display 14. The primary display 14 can also display the bonus game associated with the base wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the base wagering game by making a wager via the value input device 18 of the gaming machine 10. A player can select play by using the player input device 24, via the buttons 26 or the touch screen keys 30. The base game consists of a plurality of symbols arranged in an array, and includes at least one payline 32 that indicates one or more outcomes of the base game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information.

Also, in some embodiments, the information reader 52 may be used to restore game assets that the player achieved and saved during a previous game session. Assets may be any number of things, including, but not limited to, monetary or non-monetary awards, features that a player builds up in a base, bonus or progressive game to win awards, etc. Monetary awards can include game credits or money. Non-monetary awards, or wagering-game enhancement parameters, can be free plays (e.g., free spins), extended game play, multipliers, wild reels, multiplying wilds, access to bonus and/or progressive games, or any such wagering-game enhancement parameters that allow players to receive additional or bonus awards.

Figure 1B:
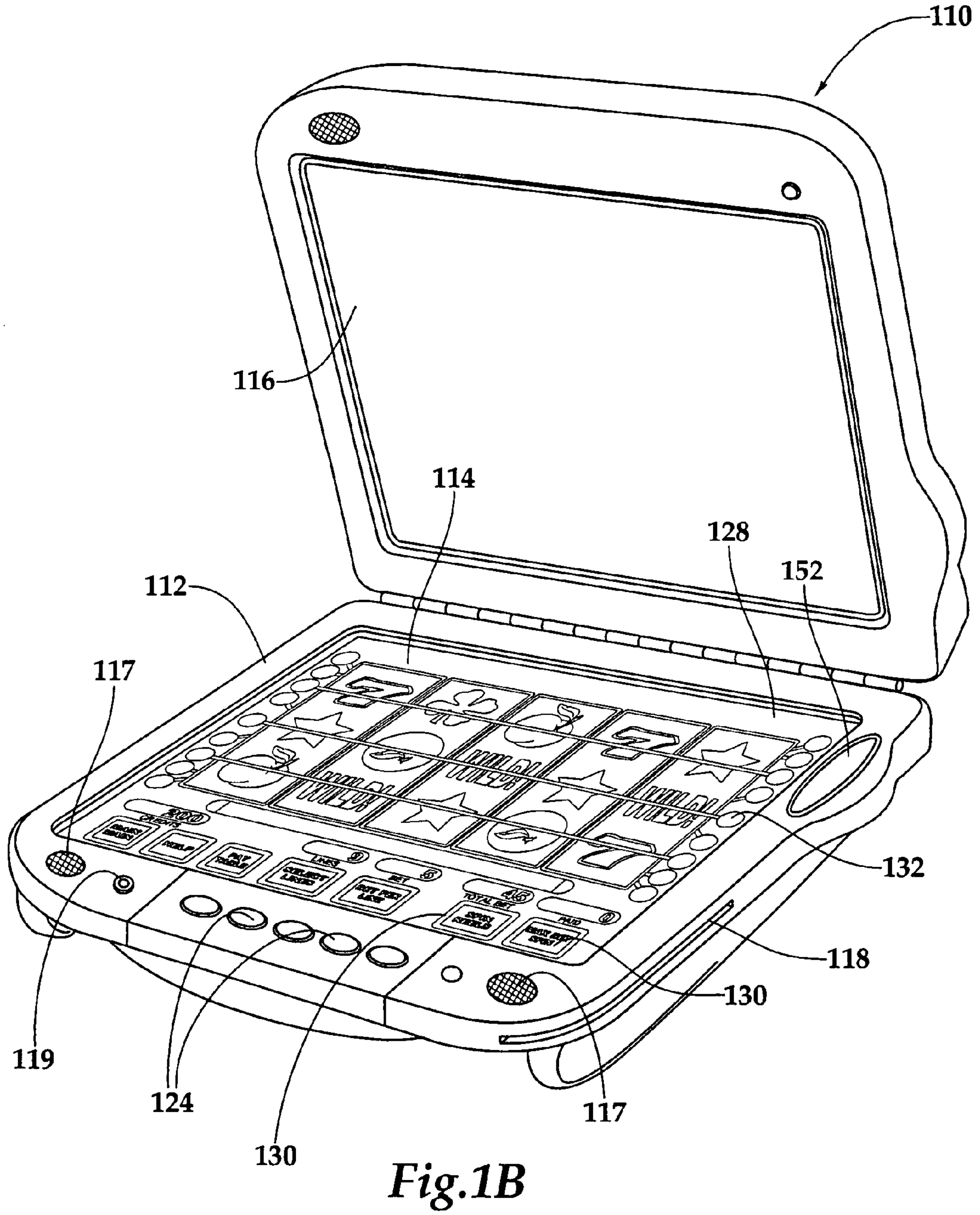
FIG. 1*b* is a perspective view of a handheld gaming machine.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons 126 on a button panel for operating the handheld gaming machine 110. In addition, or alternatively, the player input device 124 may comprise a touch screen mounted to a primary display 114 and/or secondary display 116. In one aspect, the touch screen is matched to a display screen having one or more selectable touch keys 130 selectable by a user's touching of the associated area of the screen using a finger or a tool, such as a stylus pointer. A player enables a desired function either by touching the touch screen at an appropriate touch key 130 or by pressing an appropriate push button 126 on the button panel. The touch keys 130 may be used to implement the same functions as push buttons 126. Alternatively, the push buttons 126 may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the base wagering game on the handheld gaming machine 110 is displayed to the player on the primary display 114. The primary display 114 can also display the bonus game associated with the base wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the base wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 10. In at least some aspects, the base game may comprise a plurality of symbols arranged in an array, and includes at least one payline 132 that indicates one or more outcomes of the base game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1, comprises a biometric sensing device.

Figure 2:
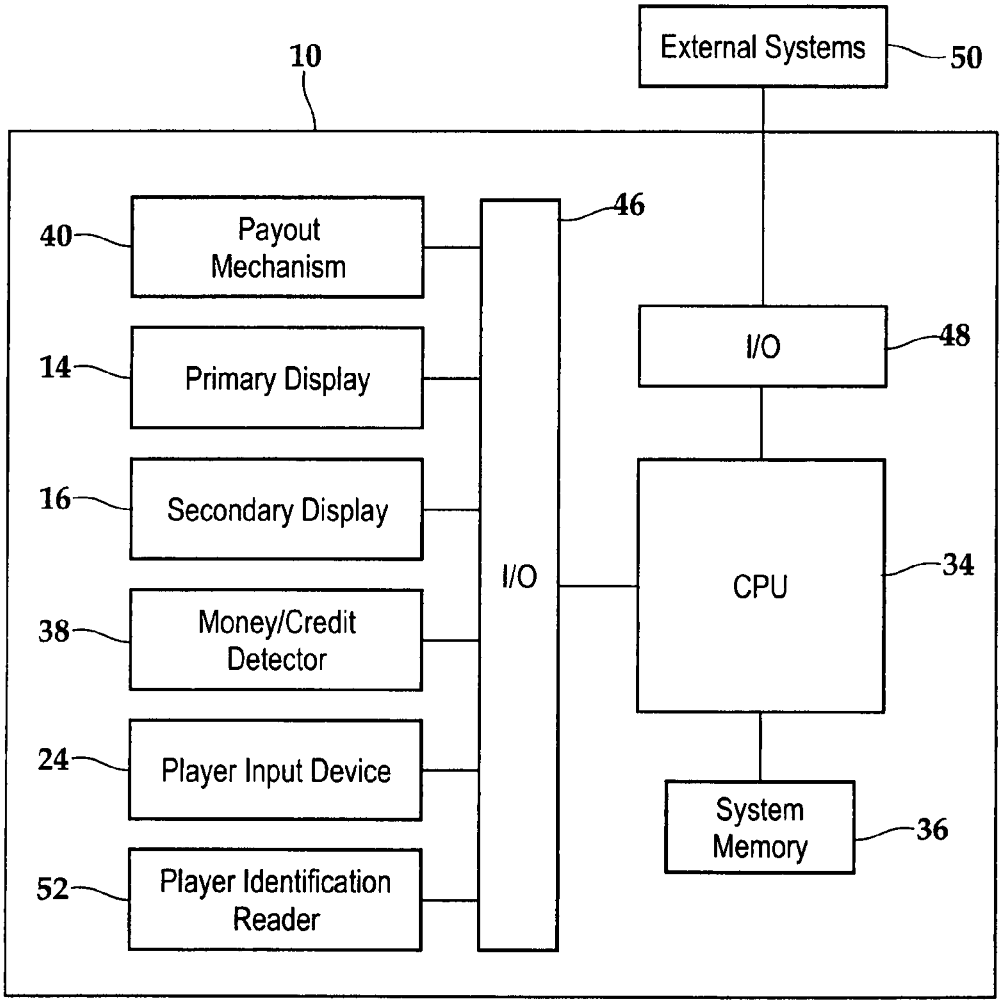
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the base game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10 bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

In some embodiments, the controller 34 may be used with the information reader 52 to restore saved assets, such as wagering-game enhancement parameters. For example, in one embodiment, the information reader 52 may be adapted to receive and distribute tickets. The tickets each include a unique identifier. The unique identifier links the ticket to a file contained within the system memory 36. The file includes assets that are being stored from a previous game or episode and may be restored by the controller 34 at the gaming machine 10. Additionally or alternatively, the external systems 50 may allow the player to retrieve assets obtained while playing at one gaming machine 10 at a different gaming machine 10 that is also part of the external systems 50.

When a player inserts a ticket into the information reader 52, the controller 34 obtains the unique identifier and causes the appropriate memory to be searched and the file containing the unique identifier matching the identifier on the ticket is retrieved. Any assets, such as wagering-game enhancement parameters, or other information contained in this file from previous gaming sessions or episodes are then transmitted to the gaming machine 10, and the player regains any assets that were saved during previous gaming sessions or episodes. This allows the player to keep assets even after a particular gaming session ends, which increases player commitment to a game and decreases vulturing (and possibly even ends it).

In other embodiments, the information reader 52 may include a card reader, and the unique identifier provided at the gaming machine 10 may be stored on a personal identification card. Or, the gaming machine 10 may include a radio frequency identification device (RFID) transceiver or receiver so that an RFID transponder held by the player can be used to provide the unique identifier of the player at the gaming machine 10 without the need to insert a card into the gaming machine 10. RFID components can be those available from Pacific Northwest National Laboratory (under the United States Department of Energy) of Richland, Wash.

In some embodiments, the RFID may be embedded in a sticker that is placed on a card, such as a personal identification card, that can be inserted into the information reader 52. Alternatively, the RFID may be embedded in a gaming token. The gaming token may be plastic, metal or a combination thereof. The gaming token may be inserted into the coin acceptor 20 or any other player input device 24 that is capable of reading the RFID and identifying assets that a player has collected. The token may have certain features, some visible to the player and some not visible to the player, that relate to the wagering game.

In other embodiments, the information reader 52 may include a biometric reader, such as a finger, hand, or retina scanner, and the unique identifier may be the scanned biometric information. Additional information regarding biometric scanning, such as fingerprint scanning or hand geometry scanning, is available from International Biometric Group LLC of New York, N.Y. Other biometric identification techniques can be used as well for providing a unique identifier of the player. For example, a microphone can be used in a biometric identification device on the gaming machine 10 so that the player can be recognized using a voice recognition system.

In other embodiments, the player may simply have to enter in a unique identification code and password into the gaming machine 10. In these embodiments, the player would not have to insert a physical object (such as a card or ticket) into the gaming terminal, but would instead use the information reader 52 as an input device, such as a keyboard.

In summary, there are many techniques in which to provide a unique identifier for the player so that the assets, such as wagering-game enhancement parameters and other items or information accumulated by the player during one or more wagering sessions, can be stored in the system memory 36 or other appropriate memory, thereby allowing the player to subsequently access those assets at the same gaming machine 10 or a different gaming machine 10. In this manner, various assets related to the wagering game features and formats can be stored after one gaming session and used in a subsequent gaming session(s) to enhance the gaming experience for the player. In particular, wagering-game enhancement parameters associated with particular episodes of a wagering game may be saved and retrieved to use in future gaming sessions. Furthermore, in addition to saving assets and wagering-game enhancements parameters, the state of a wagering game or the state of an episode in the wagering game may be saved such that a player may resume game play from the point where the player left off.

The gaming machines 10, 110 may communicate with external systems 50 (in a wired or wireless manner) such that each machine operates as a "thin client," having relatively less functionality, a "thick client," having relatively more functionality, or through any range of functionality therebetween. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

An example wagering game which may be played on the gaming machine 10 or 110 is characterized by changing the probability for awarding a special event, such as a bonus game, if predetermined criteria (e.g., completing a number of steps in the form of bonus awards required to become eligible to receive a special event) are satisfied. In this example, game enhancement parameters such as a wild reels, multipliers, and multiplying wilds bonuses in an episodic game are required to unlock eligibility for a special event such as a bonus game. Once the predetermined criteria are met, the probability of triggering the special event is increased by randomly awarding a game enhancement parameter such as a "Bonus Boost" that reduces the number of bonus trigger symbols in the base game required to trigger the special event.

In particular, when a player has completed a predetermined number of steps, he or she is eligible for the special event to end that particular episode, allowing progression on to the next episode. However, each of those steps, when achieved, provide the player with some type of game-enhancement parameter, which has the ability to affect (i.e., increase) the award in the base game. After all of the steps are completed, those game enhancement parameters are no longer available from the base game, awaiting the triggering of the special event such as a bonus game. The player may not successfully trigger the special event until the player becomes eligible (i.e., completing the steps). As the player continues play of the base game, the expected value (EV) of the base game remains the same but the EV of the special event is increased reflecting the completion of steps or bonuses such that the game-enhancement parameters are no longer available. Thus, the expected value attributable to the game enhancement parameters that are no longer available must be "transferred" or "shifted" to the special event. One way to achieve this EV shift is to randomly provide the player with a new game-enhancement parameter such as a Bonus Boost to increase his or her probability of triggering the special event each time the Bonus Boost is awarded. This compensates for the portion of the EV which normally would be given in the form of game enhancement parameters (bonuses which have been awarded to the player) that are no longer available. Thus, the reduced EV of the game from the unavailable game enhancement parameters is compensated for by providing the player with an increased probability of triggering the special event once a predetermined eligibility requirement (completion of the multiple steps) has been met.

Figure 3:
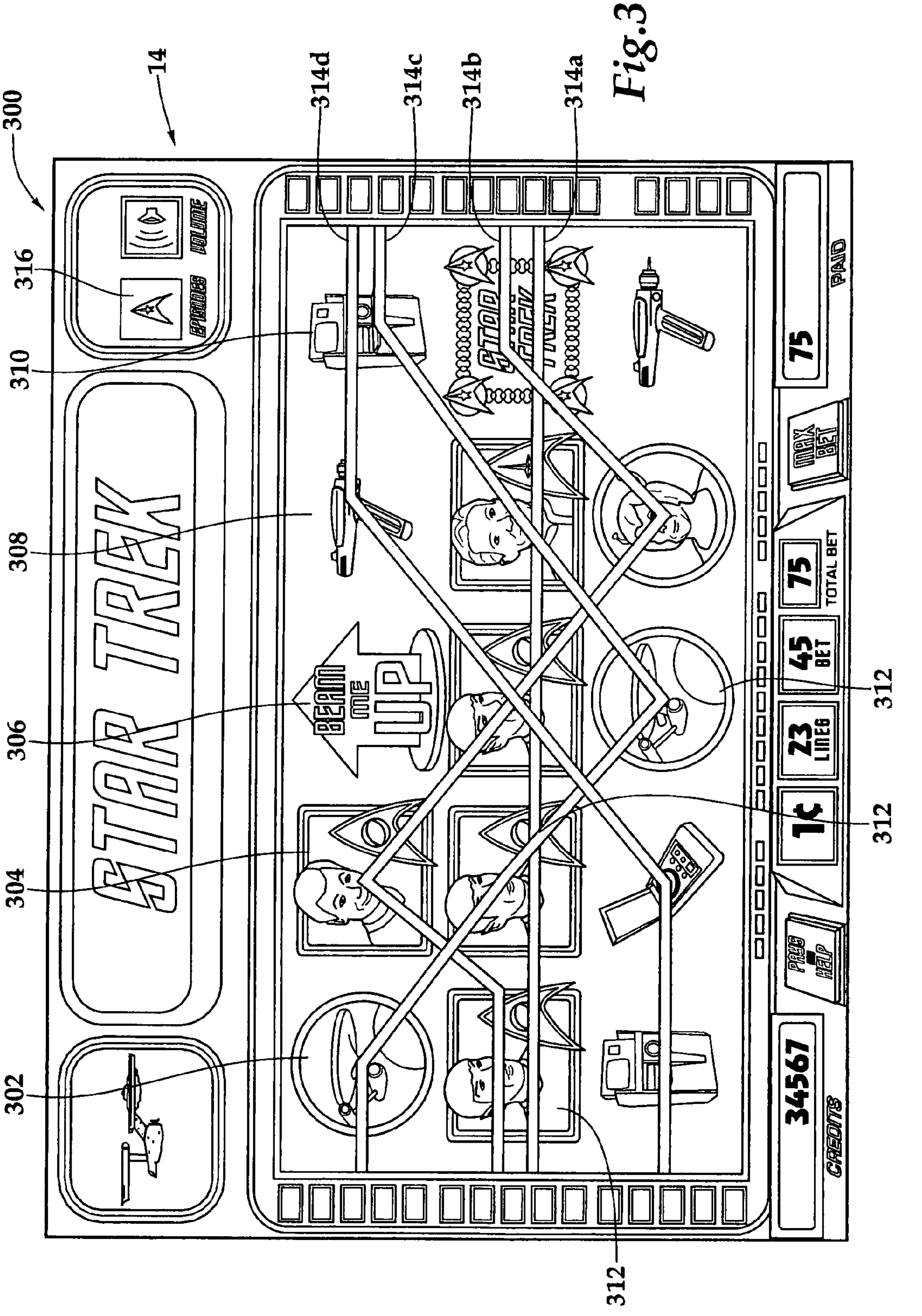
FIG. 3 is an illustration of a graphic display of a reel type wagering game awarding a bonus game.

FIG. 3 is an illustration of an example display graphic 300 in conjunction with a slot reel base wagering game played on the gaming machine 10 or 110. The display graphic 300 is for a wagering game with a STAR TREK® theme. Of course, the principles described herein may be used on any type of wagering game with differing themes. The display graphic 300 may be shown on the primary display 14 or the secondary display 16 of the gaming machine 10. The display graphic 300 shows a slot game having a number of reels 302, 304, 306, 308 and 310. Although five reels are shown in this example, it is to be understood that additional or fewer reels may be used.

The reels 302, 304, 306, 308 and 310 each have different symbols 312. In accordance with the STAR TREK® theme, the symbols 312 on the reels 302, 304, 306, 308 and 310 are space-related symbols. The symbols 312 may appear in a futuristic setting and may be designed to attract players who may be familiar with the STAR TREK® television show. The symbols 312 may include pictures of the crew of the STARSHIP ENTERPRISE, as well as words, characters, phrases, instruments, weapons, etc. that relate to the STAR TREK® theme. The combination of the symbols 312 on the different reels 302, 304, 306, 308 and 310 may be used to display a predetermined outcome from the wagering game. In this example, a predetermined outcome which is a winning outcome may be displayed by combinations of the same symbols 312 on the reels 302, 304, 306, 308 and 310. According to one embodiment, three or more of the same symbols on the reels 302-310 must be aligned along an active payline, starting from the leftmost reel 302, to achieve a winning symbol combination.

In this example, a player makes a first wager input via the value input device 18 that is associated with a first group of paylines 314*a*, 314*b*, 314*c* and 314*d* that are selected by a player. The paylines 314*a-d* are associated with selected groups of five symbols from the respective reels 302, 304, 306, 308 and 310. The plurality of outcomes in the wagering game is represented via the symbols 312 arranged on the reels 302-310. The paylines 314*a*-314*d* are associated with a plurality of symbols that indicate a randomly selected outcome that is arranged from left-to-right on the reels 302-310. The option of wagering on multiple paylines may be made available to a player via a button on the push-buttons 26 or via the touch-screen 28. Alternatively, the paylines may be activated automatically, such as when a player makes a wager input at the gaming machine 10 or 100.

Referring to FIG. 3, the display graphic 300 illustrates the reels 302, 304, 306, 308 and 310 on the primary display 14. The reels 302-310 which are also referred to as symbol-bearing reels or spinning reels are in a stopped position in FIG. 3. The reels may be activated by the player making a wager and an image of the reels 302-310 spinning may be displayed. A winning outcome indicated by a winning symbol combination in the base wagering game requires three or more symbols on the reels 302-310 to be aligned along an active payline, starting from the leftmost reel 302. As shown in FIG. 3, four paylines 314*a*-314*d* have been selected by the player and are, therefore, active. A payline indicator is used to indicate whether a particular payline has been selected. For example, the payline indicator may include a highlighting (e.g., a large bolded circle) to indicate that each one of the paylines 314*a*-314*d* has been selected, and an assigned number to indicate a respective payline to the player (e.g., the payline 314*a* may be indicated to the player as payline 1).

The wagering game using the display graphic 300 allows a player to select different paylines which may extend horizontally across the reels 302-310 such as the payline 314*a* which extends across the center symbol of each one of reels 302-310. The payline 314*b* starts in the center symbol of the first reel 302, extends through the top symbol of the second reel 304, the center symbol of the third reel 306, and through the bottom symbol of the fourth reel 308, and ends in the center symbol of the fifth reel 310. The payline 314*c* starts in the top symbol of the first reel 302, extends through the center symbol of the second reel 304, the bottom symbol of the third reel 306, and through the center symbol of the fourth reel 308, and ends in the top symbol of the fifth reel 310. The payline 314*d* starts in the bottom symbol of the first reel 302, extends through the bottom symbol of the second reel 304, the center symbol of the third reel 306, and through the top symbol of the fourth reel 308, and ends in the top symbol of the fifth reel 310. The symbols aligned along the payline 314*a* are shown to indicate a winning combination, i.e., three "MCCOY" icons in a row. None of the other active paylines 314*b*-314*d* shown in FIG. 3 has a winning combination of symbols. On selecting a winning payline, a player may be awarded additional credits depending on the number of credits wagered, the number of identical symbols in the winning payline and the paylines which contain winning combinations. An additional bonus in addition to the base game winning outcomes may be made available to the player from the base game. In this example, the additional bonus is awarded to a player when three RED ALERT symbols are displayed on the reels 302-310. The player is then awarded additional free spins. Of course other bonuses based on one or more special symbols on the reels may be awarded.

On a portion of the primary display 14, an episode indicator button 316 is shown which may indicate which episode is currently being played in the wagering game where the wagering game contains one or more episodes. Using the episode indicator button 316, the player may be able to select which episode to play once a particular episode has been completed. For example, once a player has completed a first episode and moves on to play a second episode, the player may use the episode indicator button 316 to move from the second episode back to the first episode (and vice versa). The episode indictor button 316 may also allow a player to go back to earlier episodes in prior wagering games. In yet other embodiments, the episode indicator button 316 may allow a player to select an episode after returning to play the gaming machine 10 at a later time. This type of persistent state feature allows a player to leave the gaming machine 10 and return in a later gaming session to resume game play from the point where the player left off. The episode indicator button 316 allows the player to choose the episode from which to resume game play.

Furthermore, the player may be allowed to play through one or more episodes over the course of multiple gaming sessions and resume any one of the episodes from the point where the player left off using an identifier that indicates the state of the episode. As discussed above, the identifier may include information about the state of the episode which may be stored on a ticket, card, RFID transceiver or receiver embedded in a sticker or token, biometric reader, identification code and password, etc. Once a player desires to resume game play, the player may return to the same gaming machine 10 or a different gaming machine 10 on which the wagering game is available for play. Thus, the player is able to save the state of the episode, along with the wagering-game enhancement parameters collected during the episode, at the conclusion of a gaming session and then return to the episode and resume game play at a later time.

In the embodiments of the present invention, an episode is a segment of the wagering game that includes a plurality of subfeatures or featurettes. The subfeatures in each episode may consist of a series of "first screen" bonuses, i.e., bonuses utilizing or played on the base game reels 302-310, that have various items that may be collected by the player while the base game is being played. The subfeatures may be associated with wagering-game enhancement parameters that may include wild reels, wild symbols, multipliers, multiplying wilds, and other assets. These wagering-game enhancement parameters may be applied to the base game in response to the items being collected.

Figure 4:
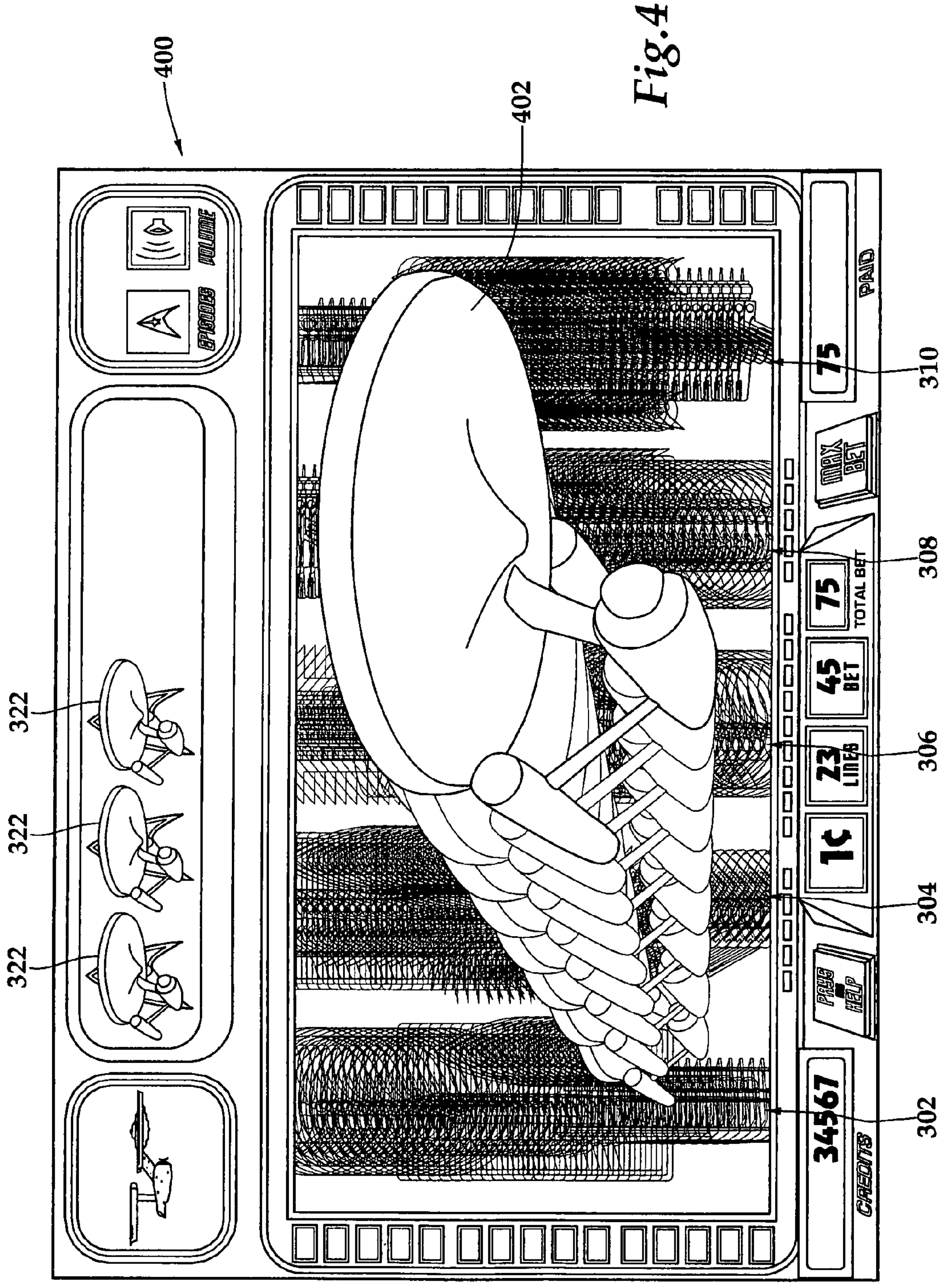
FIG. 4 is an illustration of a graphic display for the wagering game in FIG. 3 showing the reels spinning with a bonus indicator superimposed.

FIG. 4 shows a display graphic 400 of spinning reels 302-310 after a player selects one or more paylines and makes a wager on the selected payline(s). The display graphic 400 includes a series of bonus icons or items 322 which are located above the reels 302-310. The bonus icons or items 322 represent wagering-game enhancement parameters that relate to a subfeature as discussed above. In this example, the bonus icons or items 322 in FIG. 4 are represented by a STARSHIP ENTERPRISE symbol. Each subfeature may include multiple bonus icons or items 322 that are collected by the player. In the embodiment shown in FIG. 5, the subfeature displays five possible bonus icons or items 322, though more or less than five bonus icons or items 322 may be displayed. The wagering-game enhancement parameters represented by the bonus icons or items 322 are randomly awarded during play of the base game. Alternatively, the awarding of the wagering-game enhancement parameters may be related to the outcomes of the base game.

When a player begins playing a first episode of the wagering game, all five of the bonus icons or items 322 are lit up signifying that the player still has five bonus icons or items 322 remaining. As each wagering-game enhancement parameter is randomly awarded, a bonus icon or item 322 is faded. As shown in FIG. 4, three bonus icons or items 322 remain lit indicating that the player has been awarded two out of the five available wagering-game enhancement parameters and three wagering-game enhancement parameters remain for completion of the subfeature. The wagering-game enhancement parameters may be awarded on a random basis independent of the winning outcome on a particular payline 314. In this embodiment, the wagering-game enhancement parameters are awarded, on average, approximately once every 40 plays of the base wagering game, although the actual frequency at which the parameters are awarded is randomized.

According to the embodiment shown in FIG. 4, a bonus indicator 402 is interposed over the image of the spinning reels 302-310 to indicate the award of a wagering-game enhancement parameter. In this example, the bonus indicator 402 is an image of the STARSHIP ENTERPRISE moving through space consistent with the game theme. When the bonus indicator 402 appears on the display graphic 400, the game awards the wagering-game enhancement parameter associated with that subfeature and removes or fades out one of the bonus icons or items 322 at the top of the display graphic 400. In some embodiments, the wagering-game enhancement parameter affords a player a greater probability of winning the base wagering game on the next spin of the reels.

Figure 5:
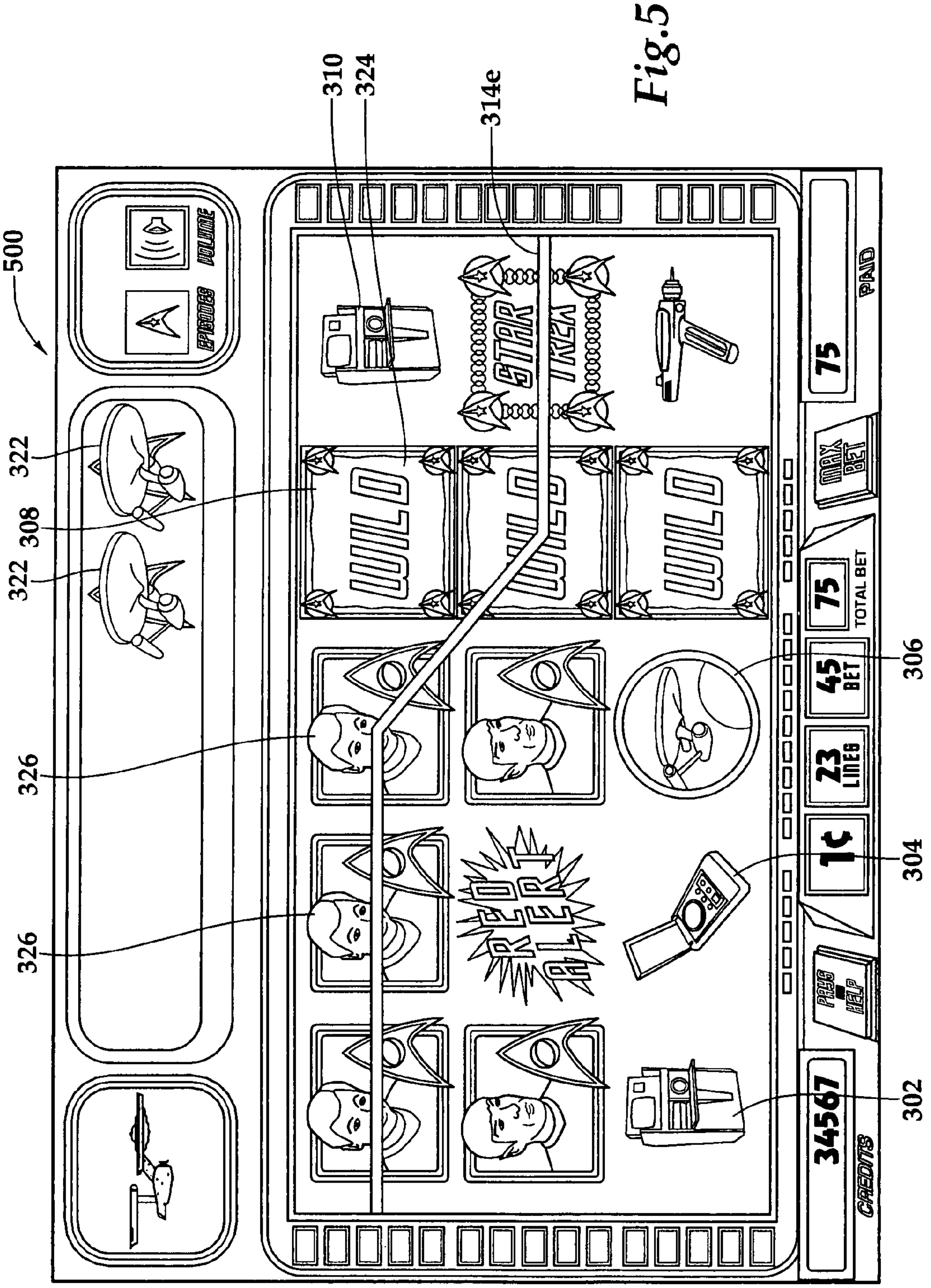
FIG. 5 is an illustration of a graphic display showing the award of a bonus in the wagering game of FIG. 3.

FIG. 5 illustrates a display graphic 500 displaying reels 302-310 having a wagering-game enhancement parameter which is displayed when the bonus indicator 402 appears in FIG. 4. In this case, one of the reels, the fourth reel 308, appears with all wild symbols, reflecting the award of a wild reel 324 for this spin. The player thus gains the advantage of being awarded for paylines 314 with one less winning symbol because the wild reel 324 on the fourth reel 308 is considered part of any winning payline 314. Thus, the wagering game enhancement parameter, i.e., the wild reel 324, increases the probability of achieving a winning outcome in the wagering game.

In this example, the payline **314*e* is associated with a winning combination containing three identical MCCOY symbols 326 and one of the wild symbols from the wild reel 324 rather than the normal four identical symbols in a row from left to right. The wild reel 324 is an example of the wagering-game enhancement parameter which may be awarded five times during the subfeature although different numbers of bonuses may be used. As shown in the embodiment in FIG. 5, three wild reels have already been awarded and thus two bonus icons of items 322 are lit signifying two potential wild reels remaining. Once a predetermined number of bonus icons or items 322** have been collected, e.g., five wild reels, indicating the awarding of all five of wagering-game enhancement parameters, the first subfeature is completed.

Figure 6:
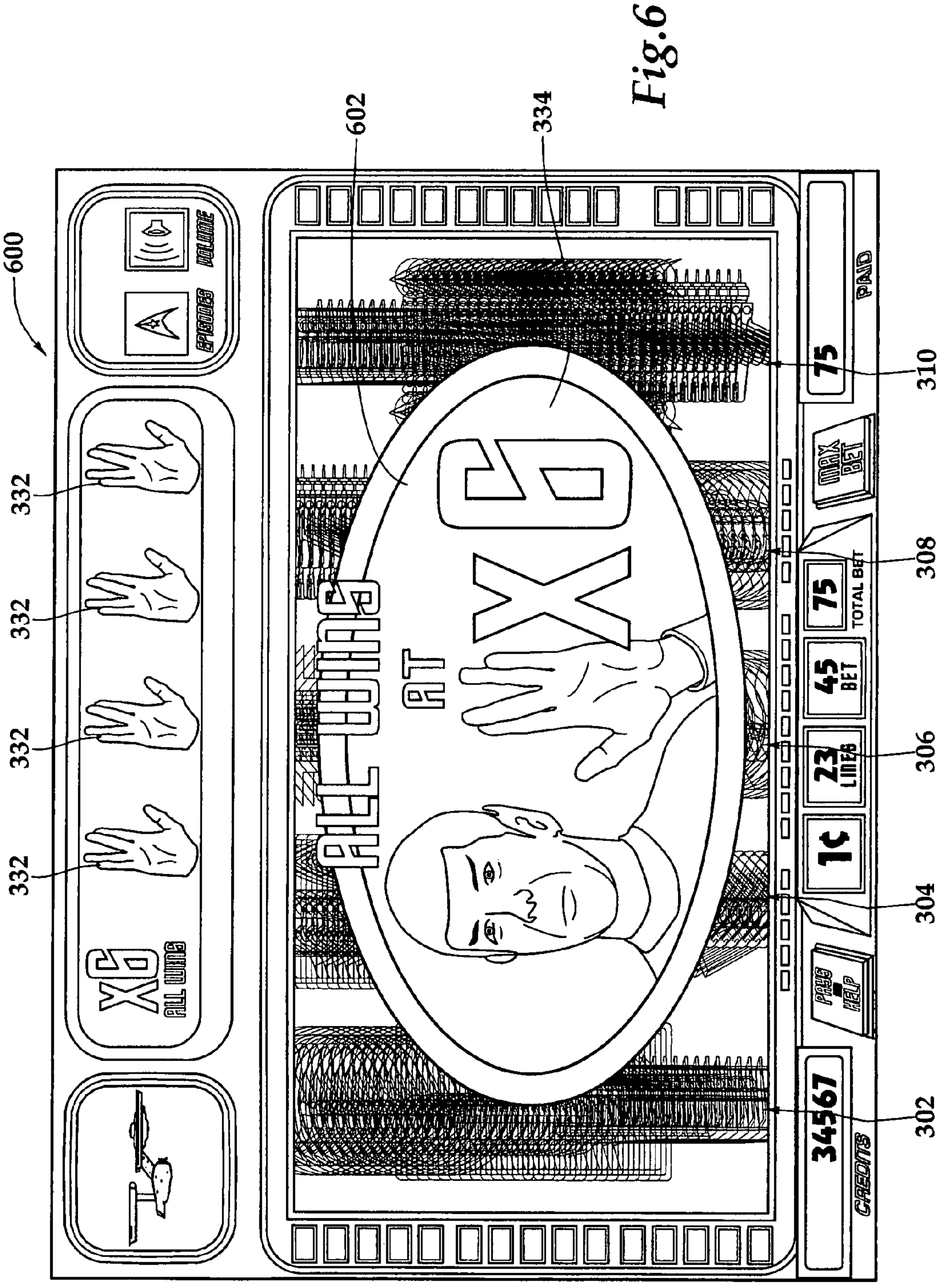
FIG. 6 illustrates a graphic display of the wagering game of FIG. 3 showing the award of additional bonuses.

FIG. 6 illustrates a display graphic 600 showing a second subfeature of the first episode of the wagering game which includes a different set of bonus icons or items 332. The second subfeature is activated after a predetermined number of the bonus icons or items 322 and associated wagering-game enhancement parameters in the first subfeature in FIGS. 3-5 are awarded to a player. Specifically, FIG. 6 includes a graphic of the reels 302-310 spinning after a player makes a wager. The different set of bonus icons or items 332 are lit on commencement of the second subfeature. In this example, the second subfeature may award five wagering-game enhancement parameters associated with the bonus icons or items 332 which are different from the wagering-game enhancement parameters of the first subfeature. The wagering-game enhancement parameters may be awarded entirely randomly and independent of the outcomes displayed on the reels 302-310. Alternatively, the awarding of the wagering-game enhancement parameters may be related to the outcomes displayed on reels 302-310.

According to the embodiment shown in FIG. 6, a bonus indicator 602 is interposed over the image of the spinning reels 302-310 to indicate the award of a wagering-game enhancement parameter. In this example, the bonus indicator 602 is an image of SPOCK HANDS consistent with the game theme. When the bonus indicator 602 appears on the display graphic 600, the game awards the wagering-game enhancement parameter associated with that subfeature and removes or fades out one of the bonus icons or items 332 at the top of the display graphic 600.

In this embodiment, the SPOCK HANDS are associated with multipliers 334. As each multiplier 334 is awarded, one of the bonus icons or items 332 is removed or faded from the display graphic 600. There are four remaining bonus icons or items 332 in FIG. 6 signifying that the player has been awarded one wagering-game enhancement parameter in the form of the multiplier 334 out of five that are required for the second subfeature. The multipliers 334 may be randomly awarded during play of the wagering game or may be related to the outcomes displayed on the reels 302-310.

Thus, when the reels 302-310 are shown to be spinning on the screen, the SPOCK HANDS multiplier 602 may appear which signifies awarding a player a multiplier for modifying an award. The multiplier 602 may be applied to any winning outcomes based on selected paylines for the next or future reel spins. For example, in FIG. 6, an award from a winning outcomes along a selected payline(s) is multiplied by 6 times the original award value. In some embodiments, the multiplier 602 may randomly vary from three to ten times the original award value. As with the first subfeature described above, when five multipliers 602 have been awarded signifying the award of the five wagering-game enhancement parameters available, the player completes the second subfeature and moves on to the next subfeature.

Figure 7:
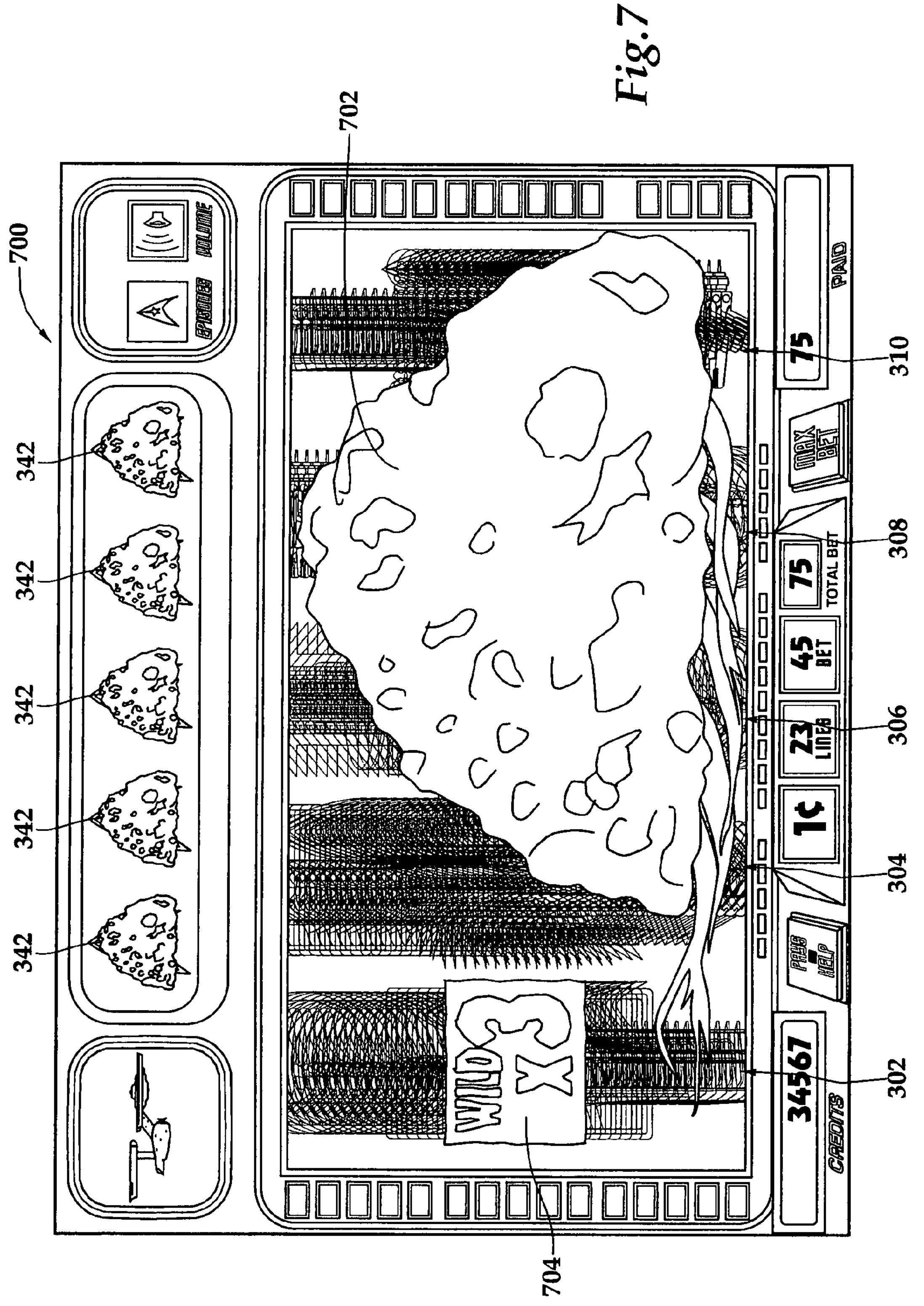
FIG. 7 illustrates a graphic display of the wagering game of FIG. 3 showing the award of still additional bonuses.

FIG. 7 illustrates a display graphic 700 showing a third subfeature of the wagering game which is activated after all of the bonus icons or items 332 in the second subfeature shown in FIG. 6 are completed. FIG. 7 shows the reels 302-310 spinning after a player makes a wager. A new set of bonus icons or items 342 are displayed along the top of the display graphic 700, As with the prior subfeatures, the bonus icons or items 342 are initially lit and individually removed or faded out when each wagering-game enhancement parameter is awarded as a part of the subfeature.

According to the embodiment shown in FIG. 7 and consistent with the subfeatures described above, a bonus indicator 702 is interposed over the image of the spinning reels 302-310 to indicate the award of a wagering-game enhancement parameter. In this example, the bonus indicator 702 is an image of the HORTAS ALIEN consistent with the game theme. When the bonus indicator 702 appears on the display graphic 700, the game awards the wagering-game enhancement parameter associated with that subfeature and removes or fades out one of the bonus icons or items 342 at the top of the display graphic 700. In this embodiment, the HORTAS ALIEN is associated with multiplying wilds 704. As each multiplying wild 704 is awarded, one of the bonus icons or items 342 is removed or faded from the display graphic 700. The multiplying wilds 704 may be randomly awarded during play of the wagering game or may be related to the outcomes displayed on the reels 302-310.

In FIG. 7, a player has been awarded one multiplying wild 704 and thus four bonus icons or items 342 remain lit. When a multiplying wild 704 is awarded, a player receives a multiplying wild symbol having a multiplier value on one of the reels 302-310. The multiplying wild 704 may be incorporated into the player selected payline or paylines 314, thus increasing the probability of a winning outcome. If a winning outcome is achieved, the award is multiplied by the multiplier value shown on the multiplying wild 704, e.g., three times the original award.

Once a certain predetermined number of bonus icons or items 322, 332, 342 has been collected, i.e., five STARSHIP ENTERPRISES, five SPOCK HANDS and five HORTAS ALIENS, the player becomes eligible to participate in a special event. In one embodiment, the special event is an episode-completing bonus game. Once becoming eligible, if the player receives a bonus game-triggering outcome, the player is taken to the episode-completing bonus game. If the player successfully completes the episode-completing bonus game, the episode is then completed or won and the player moves on to play another episode of the wagering game. In yet other embodiments, the collection of the bonus icons or items 322, 332, 342 by the player may itself be the trigger for the episode-completing bonus game. Other special events employing the subfeatures described herein are described in more detail below.

Figure 8:
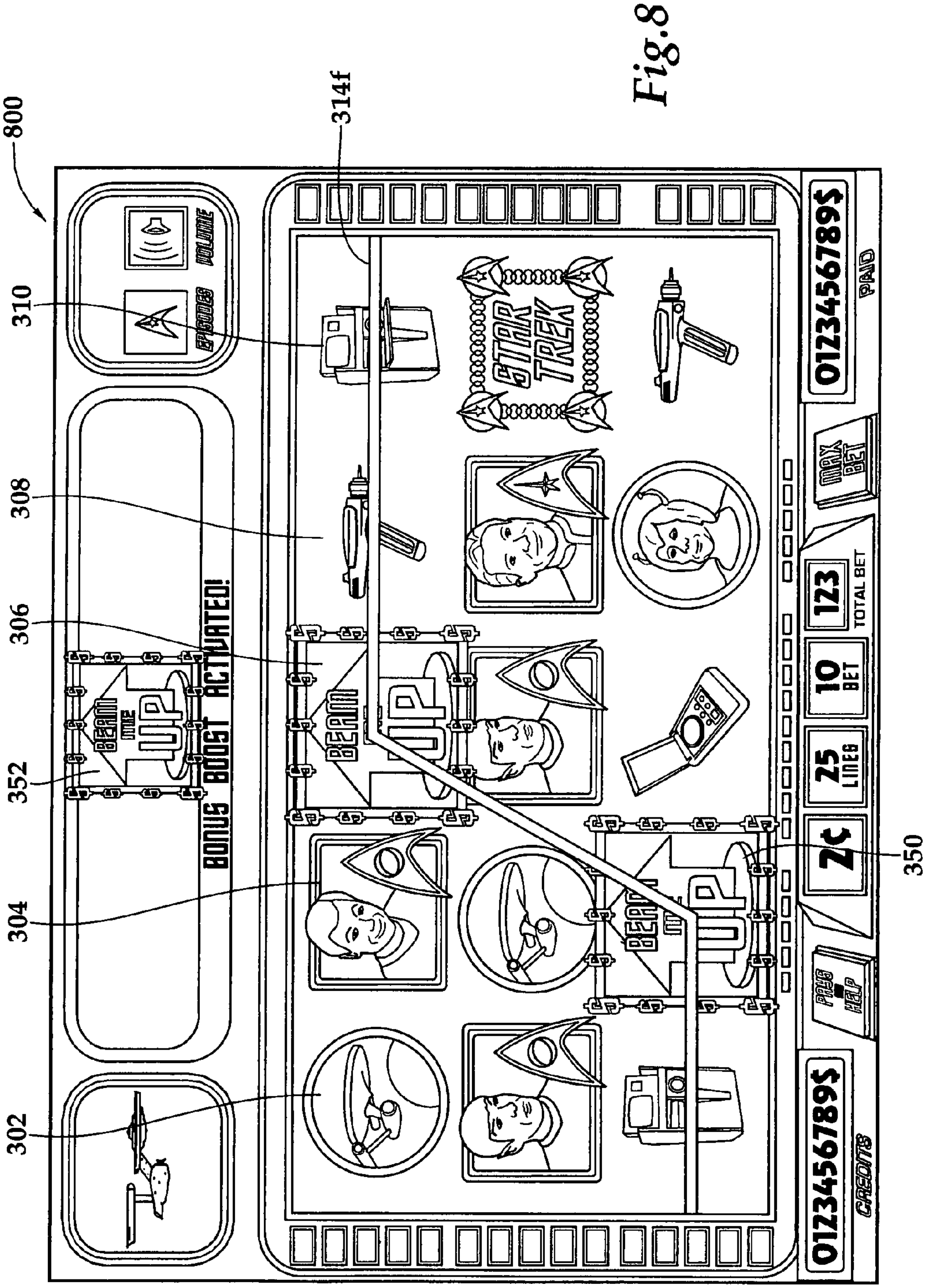
FIG. 8 illustrates a graphic display of the wagering game of FIG. 3 showing the award of bonuses that change the expected value for eligibility for a bonus game.

FIG. 8 illustrates a display graphic 800 showing the resulting game features upon completion of awarding the five bonuses in the third subfeature in FIG. 7. Upon completion of the third subfeature, the player now attempts to trigger a special event in the form of a "BEAM ME UP" bonus game by continuing to play the base game on the reels 302-310. Each subsequent play of the base game gives the player an independent probability to trigger a special event, which in this example is a bonus game. The special event may be, for example, a bonus game such as another STAR TREK themed game, a community event with other players, a progressive award, etc. In this example, the special event is a bonus game which is related to the particular episode. One such game allows a player to select a STAR TREK crew character shown on the primary or secondary displays 14 and 16 once the bonus game is triggered. The character is "beamed" down to an environment with different creatures and objects and may "phaser" the creatures and objects that in turn reveal different awards. The bonus game ends when the player picks a trap object where the player is shown another environment with objects and is given a chance to find a diamond award. The game is terminated by Klingons catching the character. Another example bonus game related to a different episode may be clearing different rooms of the STARSHIP ENTERPRISE of HORTAS ALIENS.

In the display graphic 800, special symbols such as "BEAM ME UP" symbols 350 are shown on the reels 302-310. The player earns participation in a special event such as a bonus game when a sequence of one or more of the special symbols occupies a selected payline such as the payline **314*f*. A player may be awarded a Bonus Boost as a wagering-game enhancement parameter, in the same manner as the wagering-game enhancement parameter associated with the items in each of the three subfeatures is a provided. Such a Bonus Boost is signified by the lighting of a bonus icon 352 in this example although other indicators may be used. For example, the Bonus Boost may require one less "BEAM ME UP" symbol 350** to be present on a winning payline to trigger the special event. Thus, the probability for triggering the special event is increased for the play (i.e., spin) after the Bonus Boost is awarded. As such, the overall probability of triggering the special event for the spin is increased, as the normal expected value of achieving any winning symbol combination is the same. The increase in probability of triggering the special event attributable to the Bonus Boost compensates for the loss of the expected value from such wagering-game enhancement parameters as wild reels, multipliers, and multiplying wilds which can no longer be awarded. In this example, the probability for the special event is further enhanced by the shift of the expected value from the bonus (RED ALERT symbols) which is also no longer available to the player in this part of the game.

With reference to FIG. 8, the awarding of the special event may normally be indicated by the display of three consecutive "BEAM ME UP" symbols along a payline. However, with the awarding of a Bonus Boost as shown in FIG. 8, the awarding of a special event may only require two consecutive BEAM ME UP symbols 350 along a payline such as the payline **314*f***, reflecting a higher probability of awarding the special event.

As with the previous bonus icons in FIGS. 5-7, additional wagering-game enhancement parameters in the form of Bonus Boosts allow for additional adjustment of the probability of triggering the special event (the bonus game in this example) on subsequent plays. The probability of triggering the special event is thus adjusted (i.e., increased) to compensate for the loss of expected value in the base game due to the unavailability of the previous wagering-game enhancement parameters (e.g., wild reels, multipliers, multiplying wilds, etc.). In this case, a player does not have a limit as to the number of bonuses which may be awarded before the episode ends with the award of a special event. The player can achieve that special event during any spin in which three consecutive “BEAM ME UP” symbols are on an active payline, or, if the “Bonus Boost” is provided, two consecutive “BEAM ME UP” symbols along an active payline.

Figure 9:
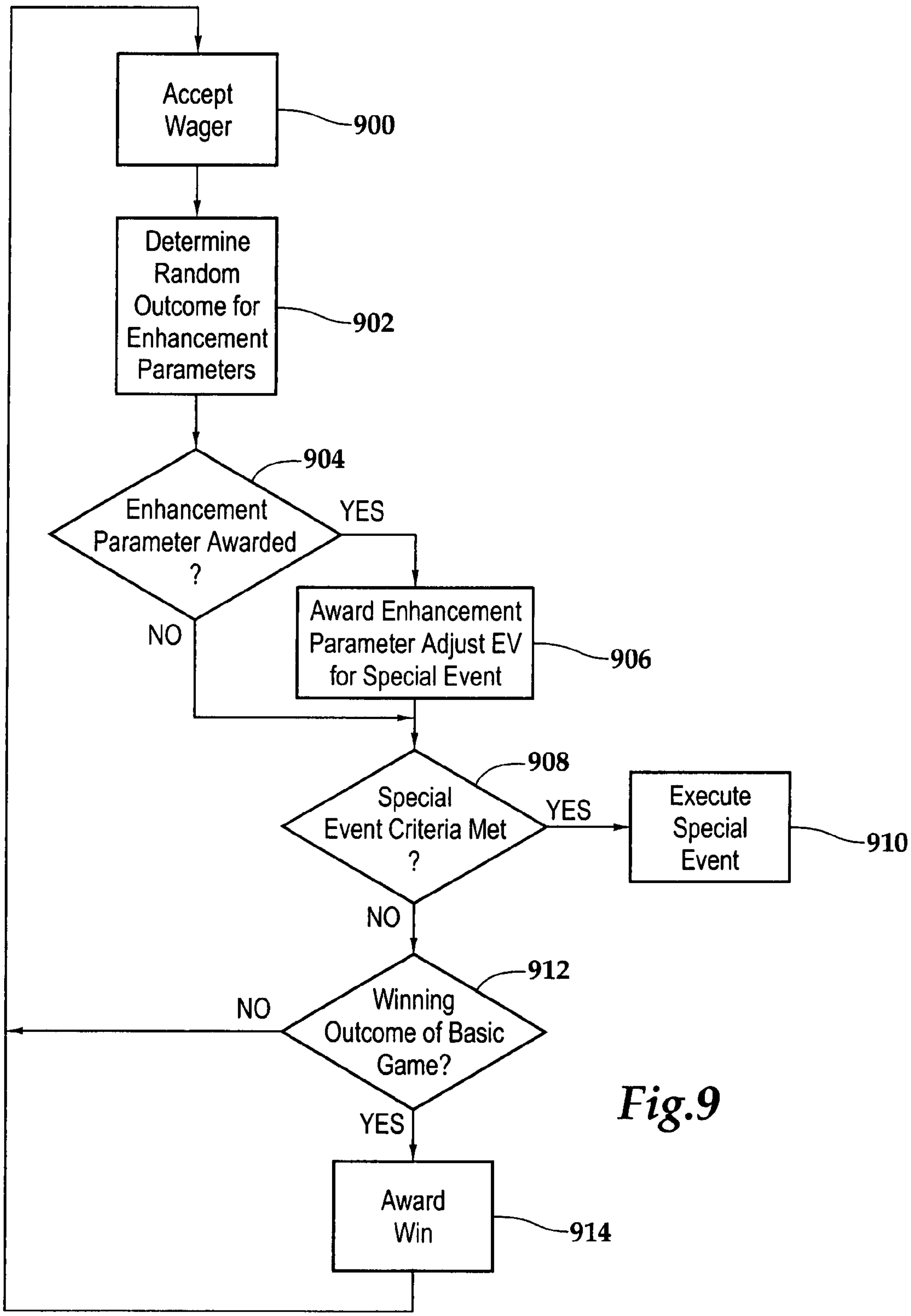
FIG. 9 is a flow diagram of the game of FIG. 3 in determining the change in expected value for eligibility for the bonus game.

FIG. 9 is a flow diagram of one possible process of adjusting the probability of the special event trigger after the three subfeatures of FIGS. 3-7 have been completed such that their associated game-enhancement parameters (awarded via the random mystery award) are no longer available to the player The process in FIG. 9 therefore occurs when the wagering-game enhancement parameters described by the above with reference to FIGS. 4-7 have already been awarded. The game first accepts a wager from a player (step 900). The game then determines a randomly determined outcome for the purpose of determining the award of the wagering-game enhancement (step 902). It is to be understood that the overall expected value of the entire wagering game remains constant (e.g., 0.9) from spin to spin of the reels of the base game. One part of the overall expected value (i.e., 0.55) is allocated to the payout from the base game displayed in the form of three or more identical symbols on the reels 302-310. In the subfeatures phase of the game, the remaining 0.35 expected value is allocated between the possible bonus (i.e., 0.20) in the form of free spins from RED ALERT symbols and the opportunity to be awarded game enhancement parameters (i.e., 0.15). Once the available game enhancement parameters are awarded, the bonuses and the game enhancement parameters are no longer available to the player. The expected value of 0.35 allocated to the bonuses and the game enhancement parameters is then shifted to the special event which is now available to the player in part by periodic increases in probability of triggering the special event via the Bonus Boosts.

After step 902, the game then decides whether the randomly determined outcome includes a wagering-game enhancement parameter outcome (step 904). If a wagering-game enhancement parameter outcome is selected in step 904, the game awards a wagering-game enhancement parameter to the player (step 906). In this example, the wagering-game enhancement parameter is a bonus allowing an adjustment to make it more probable that the player will be awarded the special event. In doing so, the game may display a Bonus Boost icon 352 as shown in FIG. 8 to signify the change in probability. The game then determines whether a special event is awarded based on either an initial probability (e.g., three BEAM ME UP symbols) or a modified probability (e.g., two BEAM ME UP symbols) as a result of the award of a Bonus Boost (step 908). If a special event such as the bonus game in this example is awarded, the game proceeds to run the bonus game (step 910). If an outcome to award a Bonus Boost does not occur (step 904), the game proceeds directly to step 908 to determine if a special event is awarded at the initial probability.

If a special event (i.e. bonus game) is not awarded (step 908), the game determines whether a winning outcome is awarded on the base game such as one of the various winning symbol combinations set forth on the game’s pay table (step 912). If a winning outcome is not achieved, the game loops back to step 900 to await another wager. If a winning outcome is awarded, the game displays the winning outcome (e.g., displays three or more identical symbols on a payline) and awards the player (step 914). The game then loops back to step 900 to await another wager from the player. The adjustment of the probabilities in step 906 results in adjusting the expected value of the special event to be equivalent to the expected value of the bonus and the game enhancement parameters (FIGS. 3-7) that are now no longer available to the player in this part of the game. Other processes can be employed as well to adjust the expected value of awarding the special event to compensate for the loss of the opportunity of being awarded the game enhancement parameters. Further, the bonus may be still made available to the player in this part of the game resulting in only a shift of the expected value of the game enhancement parameters to the special event. Also, parts of the expected value of both the bonus and the game enhancement parameters may be shifted to the special event instead, thus making the bonuses and game enhancement parameters still available to the player in this part of the game.

Each of these embodiments and obvious variations thereof is contemplated as falling within the spirit and scope of the claimed invention, which is set forth in the following claims.

What is claimed is:

1. A gaming system for playing a wagering game including a base game and a special event, the wagering game having a first expected value attributable to the base game and a second expected value attributable to the special event, the special event occurring in response to a triggering event during play of the base game; the gaming system comprising:

at least one input device;

at least one display device;

at least one controller;

at least one memory device storing instructions that, when executed by the at least one controller cause the system to:

receive, responsive to inputs via the at least one input device, wagers to play respective initial plays of the base game;

display, on the at least one display device, a randomly selected outcome of each initial play of the base game;

receive, responsive to inputs via the at least one input device, wagers to play respective subsequent plays of the base game, the subsequent plays being subsequent to the initial plays; and display, on the at least one display device, a randomly selected outcome of each subsequent play of the base game, wherein the first expected value attributable to the base game decreases from the initial plays to the subsequent plays by making a game enhancement parameter available in the initial plays unavailable in the subsequent plays, and the second expected value attributable to the special event increases from the initial plays to the subsequent plays to compensate for decreasing the first expected value attributable to the base game.

2. The gaming system of claim 1 wherein the game enhancement parameter is a bonus award.

3. The gaming system of claim 1 wherein the game-enhancement parameter increases a probability of obtaining a winning outcome in the base game or includes a bonus multiplier.

4. The gaming system of claim 1, wherein the randomly selected outcome is part of the first expected value attributable to the base game and is selected from a plurality of possible base game outcomes including at least one winning outcome; and wherein the controller enables the display device to show the plurality of base game outcomes via a plurality of symbols arranged in an array.

5. The gaming system of claim 4, wherein the symbols are shown on a plurality of reels and wherein the game-enhancement parameter enables the display of a wildcard symbol on one of the reels.

6. A method of conducting a wagering game including a base game and a special event, the special event occurring in response to a triggering event during play of the base game, the method comprising:

awarding, by at least one of one or more processors, a first game enhancement parameter with a first randomly-selected outcome selected from a first plurality of outcomes in the base game;

subsequent to awarding the first game enhancement parameter, awarding, by at least one of the one or more processors, a second game enhancement parameter with a second randomly-selected outcome selected from a second plurality of outcomes in the base game, the second game enhancement parameter being associated with a special event, the first game enhancement parameter being automatically made unavailable for award with the second plurality of outcomes;

determining, by at least one of the one or more processors, whether the special event is triggered; and increasing, by at least one of the one or more processors, the probability of triggering the special event if the second game enhancement parameter has been awarded, the increasing of the probability of triggering the special event being related to a value lost from the first game enhancement parameter being made unavailable for award with the second plurality of outcomes.

7. The method of claim 6, wherein the first game-enhancement parameter increases a probability of obtaining a winning outcome in the base game.

8. The method of claim 6, wherein the first wagering-game enhancement parameter is a bonus multiplier increasing the value of a winning outcome in the base game.

9. The method of claim 6, wherein the special event includes a bonus game or eligibility for a progressive award.

10. The method of claim 6, further comprising:

determining a randomly-selected base game outcome in response to receiving a wager input from a player, the randomly-selected base game outcome being selected from a plurality of possible base game outcomes including at least one winning outcome; and displaying the base game outcome on a display device, by a plurality of symbols arranged in an array, wherein the symbols are shown on a plurality of reels and the first game-enhancement parameter allows the display of a wild symbol on one of the reels.

11. A computer-implemented method for conducting a wagering game in a gaming system, the wagering game including a base game and a special event, the method comprising:

receiving, responsive to inputs via at least one input device, wagers to play respective plays of the base game, the plays including initial plays of the base game and subsequent plays of the base game, the subsequent plays being subsequent to the initial plays;

displaying, on at least one display device, a randomly selected outcome of each play of the base game;

during one or more of the initial plays of the base game, randomly awarding, by at least one of the one or more processors, at least one game enhancement parameter, the game enhancement parameter modifying one or more of the initial plays;

in response to completion of the initial plays of the base game, automatically excluding, by at least one of the one or more processors, the game enhancement parameter from being available for the subsequent plays;

during one or more of the subsequent plays of the base game, increasing a probability of triggering the special event; and during one or more of the subsequent plays of the base game, triggering the special event.

12. The method of claim 11, wherein the game enhancement parameter increases a probability of the outcome being a winning outcome or increases a value of the outcome if the outcome is a winning outcome.

13. The method of claim 11, wherein triggering the special event in the one or more of the subsequent plays is unlocked during one of the initial plays of the base game.

14. The method of claim 11, wherein the wagering game includes an overall expected value, the overall expected value including a first expected value attributable to the base game and a second expected value attributable to the special event, wherein the first expected value is greater during the initial plays than during the subsequent plays, and wherein the second expected value is greater during the subsequent plays than during the initial plays.

* * * * *